United States Patent

[11] 3,617,352

| [72] | Inventors | Takeo Shima<br>1, 3-chome, Yamate-cho;<br>Yukiharu Asami, 1, 3-chome, Yamate-cho;<br>Shunzo Ishizaki, 11, 4-chome, Nishimi;<br>Shoji Kawase, 9, 2-chome, Yamate-cho;<br>Masao Yoshimura, 9, 2-chome, Yamate-cho, all of Iwakuni-shi, Yamaguchi-ken, Japan |
|---|---|---|
| [21] | Appl. No. | 697,586 |
| [22] | Filed | Jan. 15, 1968 |
| [45] | Patented | Nov. 2, 1971 |
| [32] | Priorities | Feb. 2, 1966 |
| [33] | | Japan |
| [31] | | 41/6057;<br>May 16, 1966, Japan, No. 41/31310; Nov. 9, 1966, Japan, No. 41/73672<br>Continuation-in-part of application Ser. No. 612,335, Jan. 30, 1967. |

[54] PROCESS, AGENT AND ARTICLE RELATING TO IMPROVED ADHESION BETWEEN A SHAPED ARTICLE OF A CRYSTALLINE POLYESTER AND RUBBER
7 Claims, No Drawings

[52] U.S. Cl. .................................................. 117/76 F,
117/77, 117/80, 117/138.8 F, 117/161 D,
117/162, 161/233, 161/241
[51] Int. Cl. .................................................. B32b 27/08,
B32b 25/08
[50] Field of Search............................. 117/138.8
F, 161 KP, 77, 162, 76, 80; 260/75 TN; 161/233, 241

[56] References Cited
UNITED STATES PATENTS

| 3,307,966 | 3/1967 | Shoaf | 117/76 |
|---|---|---|---|
| 3,401,151 | 9/1968 | Wieden et al. | 260/77.5 AM |
| 3,416,952 | 12/1968 | McIntyre et al. | 117/138.8 F |
| 2,698,241 | 12/1954 | Saner | 117/72 |
| 2,729,618 | 1/1956 | Muller | 260/75 TNK |
| 2,905,652 | 9/1959 | Best | 260/75 TNK |
| 2,982,754 | 5/1961 | Sheffer et al. | 260/75 TNK |
| 3,006,897 | 10/1961 | Parker | 260/75 TNK |
| 3,035,475 | 5/1962 | Rinke et al. | 117/138.8 F |
| 3,210,439 | 10/1965 | Aitken et al. | 117/161 KP |
| 3,268,467 | 8/1966 | Rye et al. | 117/138.8 F |
| 3,278,333 | 10/1966 | Titzmann | 117/138.8 F |
| 3,325,333 | 6/1967 | Kigane et al. | 117/138.8 F |

FOREIGN PATENTS

| 791,853 | 3/1958 | Great Britain | 260/75 TNK |
|---|---|---|---|
| 857,078 | 12/1960 | Great Britain | 260/75 TNK |
| 1,211,386 | 2/1966 | Germany | 260/75 TNK |

*Primary Examiner*—William D. Martin
*Assistant Examiner*—J. E. Miller, Jr.
*Attorney*—Sherman and Shalloway

ABSTRACT: Improvement in adhesion of articles, e.g. tire cord of ethylene terephthalate or 2,6-naphthalate polyester to rubbers. The article is coated with a polyester polyurethane polymer containing segments derived from an ethylene terephthalate or 2,6-naphthalate polyester. Ratio of said segments to the balance in the polyurethane is 1:6 to 6:1. The article is then baked. Preferred coating agents for articles of an ethylene terephthalate polyester contain ethylenical unsaturations unsaturations and/or segments derived from an ethylene terephthalate polyester modified by a chain branching agent, e.g. pentaerythritol, and having a reduced viscosity of 0.1 to 0.3. Introduction of alkali metal sulfonate groups to the polyurethane is advantageous.

PROCESS, AGENT AND ARTICLE RELATING TO IMPROVED ADHESION BETWEEN A SHAPED ARTICLE OF A CRYSTALLINE POLYESTER AND RUBBER

This application is a continuation-in-part of copending application Ser. No. 612,335 filed Jan. 30, 1967, and now abandoned.

This invention relates to a process for coating a shaped article of a crystalline polyester having a high melting point such as polyethylene terephthalate filament, yarn, cord and cord fabric upon adhering said shaped article to rubbers for advancing adhesion of said shaped article to rubbers and a coating agent used for said process.

Despite that a polyester shaped article, especially synthetic filament material of the polyester series has on one hand most desirable material properties as rubber reinforcing material such as excellent tensile strength, impact strength, elongation resistance, dimensional stability, heat resistance, chemical resistance, water resistance, bacterial resistance and weather resistance, on the other hand, because molecular structure of a polyester is low in functionality, it has a defect that according to the hitherto employed adhering treatment result, a necessary adhering strength in use has been unable to be obtained.

As an adhering method of fiber material of the polyester series to rubbers, heretofore various methods have been proposed. These method are, for instance, a method of treating a polyester filament with a treating liquid wherein compounds such as isocyanates and ethylene urea are dissolved or dispersed, thereafter adhering the fiber to rubbers. However, these methods require a large amount of a treating agent, being expensive and quite often the effects thereof in actual uses are insufficient.

It has now been found that upon adhering a shaped article of a crystalline polyester having a high melting point to rubbers, when said shaped article is coated with a polyester polyurethane polymer containing a portion derived from a crystalline polyester having a high melting point of the same series as the polyester constituting the shaped article, said portion existing in the polyurethane polymer at a weight ratio of said portion to the remaining portion of 1:6 to 6:1, adhesion of said shaped article to rubbers are remarkably advanced.

The term "rubbers" as referred to in this specification and claims mean substances having in their molecules sulfur-curable ethylenical unsaturations and being capable of being converted to elastomers by normal vulcanization. Among the rubbers there are polymers of isoprene such as natural rubbers; polymers of butadiene such as polybutadiene, a butadiene-styrene copolymer and a butadiene-acrylonitrile copolymer; polymers of chloroprene such as Neoprene; and the like rubbery material. Since the last step of bonding of a polyester shaped article to rubbers is normally carried out simultaneously with vulcanization of the rubbers, the rubber bonded to a shaped article in the final product has been vulcanized. "Adhering of a polyester shaped article to rubbers" referred to in the specification and claims of this application should be understood in this significance.

"An ethylene terephthalate polyester" referred to in the specification and claims of this application means a homopolyester or copolyester at least 60 mol percent of which being ethylene terephthalate unit, "an ethylene-2,6-naphthalate polyester" means a homopolyester or copolyester at least 60 mol percent of which is ethylene-2,6-naphthalate unit, and "a crystalline polyester having a high melting point" means an ethylene terephthalate polyester or an ethylene-2,6-naphthalate polyester.

As examples of an acid component for a copolyester, there may be cited difunctional acids such as terephthalic acid (in the case of a terephthalate polyester), isophthalic acid, $\beta$-hydroxyethoxybenzoic acid, naphthalenedicarboxylic acid (in the case of a naphthalate polyester), diphenyldicarboxylic acid and sebacic acid; and as a glycol component for modification, aliphatic, alicyclic and aromatic dihydroxy compounds such as trimethylene glycol, hexamethylene glycol, neopentylene glycol, polyethylene glycol, 1,4-bishydroxyethoxy benzene and bisphenol-A may be cited. Also, ethylene terephthalate polyesters and ethylene-2,6-naphthalate polyesters may be modified by a chain terminating agent having one ester-forming functional group such as, for instance, benzoic acid, benzoylbenzoic acid and methoxypolyethylene glycol and/or a chain branching agent having at least three ester-forming functional groups such as, for instance, glycerol, pentaerythritol and trimethylol propane.

"Of the same series" as referred to hereinabove means, when a shaped article comprises an ethylene terephthalate polyester, a polyurethane polymer containing a portion derived from an ethylene terephthalate polyester is used as a coating agent, and when a shaped article comprises an ethylene-2,6-naphthalate polyester, a polyurethane polymer containing a portion derived from an ethylene-2,6-naphthalate polyester is used as a coating agent.

The coating agent of this invention, namely, a polyester polyurethane polymer in which segments of a crystalline polyester having a high melting point are present at a weight ratio thereof to the remaining portion of 1:6 to 6:1, may be produced by a process known per se. For instance, it may be produced by reacting according to the conventional method an organic diisocyanate, a difunctional chain extending agent and a crystalline polyester having a high melting point.

As diisocyanate, what has been hitherto used for production of polymers of the polyester polyurethane series will do and there is no particular restriction. When examples of very generally used diisocyanate are cited, there are toluylene diisocyanate, diphenylmethane diisocyanate and hexamethylene diisocyanate.

Instead of all or part of diisocyanate used for the preparation of said polyester polyurethane polymer, an organic dithiocyanate such as toluylene diisothiocyanate, para-phenylene diisothiocyanate and tetramethylene dithiocyanate may be used. Also instead of a part of said diisocyanate, a triisocyanate such as 1-methylbenzene-2,4,6-triisocyanate, triphenylmethane triisocyanate and diphenylmethane2,4,4'-triisocyanate may be used.

As examples of a difunctional chain extending agent, there are ethylene glycol, tetramethylene glycol, decamethylene glycol, propylene glycol, triethylene glycol, ethylene diamine, hexamethylene diamine, decamethylene diamine, benzidine, ethanol amine, sebacic dihydrazide, isophthalic dihydrazide, hydrazine, polysebatic hydrazide from sebatic dichloride and hydrazine and the like. Instead of a part of these difunctional chain extenders, a polyfunctional chain extender such as pentaerythritol, trimethylol propane and 1,2,6-hexanetriol may be used.

Instead of a part of said chain extending agents, it is possible to use high molecular weight diols, e.g. polyether diols such as polyethylene glycol, polypropylene glycol and a block copolymer of polyethylene glycol with polypropylene glycol and/or polyester diols such as polytetramethylene adipate and polyethylene sebacate. However, when such high molecular weight polyethers or polyesters are used, it is preferable to use them in an amount no exceeding 60 percent of a portion of the polymer other than a crystalline polyester having a high melting point.

A crystalline polyester having a high melting point of which at least 60 percent is an ethylene terephthalate unit or an ethylene-2,6-naphthalate unit suitable for production of a polyester polyurethane polymer of this invention is preferably having a reduced viscosity ($\eta sp/c$) of about 0.07 to 0.4 when measured at 35° C. at a concentration of 1.2 g./100 cc. in o-chlorophenol. cc. the case of a terephthalate polyester, what has a reduced viscosity of about 0.10 to 0.30 is especially preferably, said viscosity value corresponds to an average degree of polymerization of about 5 to 40. And in order to obtain a polyester polyurethane polymer excellent as a coating agent for coating a shaped article of polyethylene terephthalate, it has been found preferable to use an ethylene terephthalate polyester modified by a small amount of a chain branching agent having three or four ester-forming functional group (for instance, an ethylene terephthalate polyester modified by up to about 2 mol percent, preferably about 0.4–1.5 mol percent of pentaerythritol based on the terephthalic acid component) than using a nonmodified polyethylene terephthalate in attainable adhering strength.

Production of a polyester polyurethane polymer is not limited to any particular process, but either one of a process of reacting simultaneously a crystalline polyester having a high melting point, another difunctional compound and diisocyanate, a process of reacting a difunctional compound with diisocyanate to prepare a compound having an isocyanate terminal group, subsequently reacting said latter compound with a crystalline polyester having a high melting point, or a process of reacting a crystalline polyester having a high melting point with diisocyanate to prepare a polyester having an isocyanate terminal group, subsequently reacting the same with a difunctional compound, will do.

A reaction to produce a polyester polyurethane polymer may be carried out in a molten state, however, in many cases it is advantageous to carry out the reaction in inert organic solvent.

As a solvent used for the reaction, what is inert to an isocyanate compound and dissolves both a polyester and the objective copolymer (for instance, dimethyl sulfoxide, dimethyl formamide, etc.) may be used. Also at the reaction, a tertiary amino compound such as triethylene diamine may be used as a catalyst. It is preferable that the reaction is carried out at a temperature below 200° C. At higher temperatures dissociation of a urethane bond becomes remarkable, making difficult production of the objective compound.

By changing a ratio of the total of isocyanate terminal groups to the total of the corresponding active terminal groups in the charge, degree of polymerization of a polymer to be produced can be properly changed, however, generally it is preferable to so carry out adjustment that the ratio may become within the range of from 0.8 to 1.3.

In the polyester polyurethane polymer of this invention, weight ratio of a portion of a crystalline polyester having a high melting point to the remaining portion should be 1:6—6:1, especially 1:4–4:1. What has a weight ratio outside said range has insufficient capability as a pretreating agent for the adherence of a polyester shaped article to rubbers.

Alternatively, a polyester polyurethane polymer containing a portion of a crystalline polyester having a high melting point may be produced by a process which comprises producing a polyurethane having amino terminal groups from a bis-chloroformate such as ethylenebis-chloroformic acid and a diamine such as 4,4′-diaminodiphenylmethane, separately producing a polyester having isocyanate terminal groups from an ethylene terephthalate or an ethylene-2,6-naphthalate polyester and an organic diisocyanate, thereafter reacting said polyurethane with said polyester to block the two.

According to another feature of this invention, the polyester polyurethane polymer contains alkali metal sulfonate groups such as sodium sulfonate or potassium sulfonate. Because such a polymer containing metal sulfonate groups is excellent in water dispersibility, it has an advantage of being able to easily obtain a very stable dispersion system. Namely, upon preparing a water dispersion system, in the case of a polymer having poor water dispersibility, it is necessary to first dissolve the polymer in an organic solvent such as metacresol and emulsify said solvent with a proper emulsifier in water, however, in the case of a polymer containing a sufficient amount of the sulfonate groups such detour is unnecessary sometimes, and when detour is taken sometimes the stability of the adhesive composition is further advanced. It is also possible to obtain a uniform solution by increasing said content.

One convenient method of introducing alkali metal sulfonate groups into a polyurethane polymer is, upon producing a polyurethane polymer to use a difunctional compound containing an alkali metal sulfonate group instead of whole or a part of said difunctional chain extending agent. As examples of a proper difunctional compound containing an alkali metal sulfonate group, there may be cited, for instance, sodium 2,5-di(β-hydroxyethoxy) benzenesulfonate, potassium 3,5-di(carbo-β hydroxyethoxy)-benzene sulfonate, sodium 4,5-di(β-hydroxyethoxy)-2,7-naphthalenedisulfonate, sodium 3-hydroxyethoxy-5-carboxy-benzenesulfonate, sodium 2-amino-4-(carbo-β hydroxyethoxy) benzene sulfonate and sodium 4,4′-diamino-diphenyl-3-sulfonate. In order to introduce alkali metal sulfonate groups, it is possible to use together with or instead of these difunctional compounds, a monofunctional compound containing an alkali metal sulfonate group such as sodium 3-hydroxyethoxybenzene sulfonate and sodium 3-hydroxypropane-1-sulfonate.

Still another convenient process for producing a polyester polyurethane polymer having alkali metal sulfonate groups is to use a crystalline polyester having a high melting point modified by a modifying component containing an alkali metal sulfonate group. As examples of such a modifying component, there may be cited sodium 3,5-di(carboxyethoxy) benzenesulfonate, sodium 2,5-bis(hydroxyethoxy) benzenesulfonate, sodium 2-(carbo-β hydroxyethoxy)-5-hydroxyethoxy benzenesulfonate and potassium 4,4′-di(carbomethoxy)-diphenyl-2-sulfonate.

It has been found that a remarkable water dispersibility is obtained when the polyester polyurethane polymer contains as S at least 0.05 percent by weight, preferably at least about 0.1 percent by weight of an alkali metal sulfonate.

Accordingly, a preferable coating agent having an improved water dispersibility for coating a shaped article of an ethylene terephthalate polyester according to this invention is a polyester polyurethane polymer containing a polyester portion derived from an ethylene terephthalate polyester modified by up to 1.5 mol percent, based on the total terephthalic acid component, of a chain branching agent (for instance, pentaerythritol), said modified polyester having a reduced viscosity of 0.10 to 0.30 measured at 35° C. in orthochlorophenol, characterized in that said polyester portion exists at a ratio of the same to the remaining portion of said polyurethane polymer of 1:4 to 4:1 and said polyester polyurethane polymer contains as S at least 0.05 percent by weight of an alkali metal sulfonate group. The upper limit of S content is not critical, however, from the practical viewpoint it is normal that it does not exceed about 4 percent by weight. These preferable polyester polyurethane polymers are conveniently produced by reacting conventionally (A) an ethylene terephthalate polyester modified by up to 1.5 mol percent based on the terephthalic acid component of a chain branching chain and having a reduced viscosity of 0.10 to 0.30 measured at 35° C. in orthochlorophenol (for instance, pentaerythritol) with (B) at least one difunctional chain extending agent selected from the group consisting of diol, diamine, aminoalcohol and dihydrazide, and (C) an organic diisocyanate such that (1) a weight ratio of said ethylene terephthalate polyester (A) to said chain extending agent (B) plus said organic diisocyanate may become 1:4 to 4:1 and (2) as whole or a part of said chain extending agent, a difunctional chain extending agent containing an alkali metal sulfonate group is used in an amount sufficient to give at least 0.05 percent by weight of S content to the final polyurethane polymer. In case said modified ethylene terephthalate polyester of (A) already contains an alkali metal sulfonate group, either a sulfonate group-containing chain extending agent does not have to be used or it may be used in at least smaller amount.

Water dispersibility of a polyester polyurethane polymer may also be advanced by introducing into said polymer a tertiary amino group and neutralizing said tertiary amino group-containing polymer by such an acid as hydrochloric acid and acetic acid. Introduction of the tertiary amino group is conveniently carried out by using a difunctional chain extending agent containing a tertiary amino group instead of a part (for instance, 30 mol percent) of said difunctional chain extending agent upon producing a polyurethane polymer, or using a diol containing a tertiary amino group as a part of the diol component used for production upon preparing a crystalline polyester having a high melting point used for production of a polyurethane polymer. As examples of a proper compound containing a tertiary amino group, there is a N-alkyl-diethanolamine such as N-methyldiethanolamine, N-cyclohexyl diethanolamine, N-n-buthyldiethanolamine and N-t-buthyldiethanolamine.

According to the process of this invention, to a shaped article of a crystalline polyester having a high melting point, said coating agent of this invention is applied and said shaped article is heated to a temperature above 100° C. but below the melting point, preferably within the range of from 150° C. to 240° C.

Application of the coating agent to the shaped article may be carried out by optional operations known in the field of the art. It is possible to apply the coating agent to the shaped article in a liquid form, emulsion or water dispersion. From the viewpoint that dispersibility in water is good, a coating agent containing an alkali metal sulfonate or a tertiary amino group is advantageous. The shaped article may be treated with the coating composition by dipping, padding, spraying and other proper process known in the field of the art. The treated shaped article is, if desired, preliminarily dried, thereafter heated to a temperature from 100° C. to below the melting point of the shaped article, preferably within the range of from 170° C. to 240° C. The applying amount of the coating agent to the shaped article, which may be incidentally called as resin pickup depends upon the shape of the shaped article and the using object of the final product. To a tire cord, resin pickup of about 0.2–3.0 percent by weight is suitable in most cases and to a cable cord also resin pickup of about 0.2–3.0 percent by weight is suitable in most cases.

A product coated in accordance with the process of this invention has an improved adhesion to rubbers. Further a product coated in accordance with the process of this invention has an excellent dynamic adhering life in its adhering to rubbers. Such coated product may be strongly adhered to rubbers by the help of an adhesive usually used for adhering of, for instance, rayon fiber material and a polyamide fiber material to rubbers such as resorcinol formalin latex. The improved adhering capacity of a polyester shaped article to rubbers obtained by the process of this invention is stable for a long period. The coated product substantially retains the initial improved adhering capacity to rubbers after 6-month storage.

A polyester article treated with said preferred coating agent containing in its molecules sufficient amount of vulcanizable unsaturations can be adhered to rubbers without the help of additional adhesives. In case additional adhesives are not used, practice of a relatively high resin pickup of about 0.5 to 15 percent, preferably 1 to 10 percent by weight is preferable.

The following examples are for explaining this invention and unless otherwise indicated parts in examples show parts by weight and viscosity is measured at a concentration of 1.2 g./100 cc. at 35° C. in orthochlorophenol. H-test was conducted as follows:

Using a stainless steel mold designed for H-test, one portion of the cord, 9 mm. in length, was held securely between a pair of pads of an unvulcanized rubber compound, 3 mm. in thickness. At some distance away another portion of the same cord, measuring 9 mm. long, was also secured in the same manner between a different pair of rubber pads, 3 mm. in thickness, and the vulcanization was effected at a temperature of 135° C. under a pressure of 15 kg./cm.² for 50 minutes. On 20 samples, the load to pull out the cord from the vulcanized rubber sheet was measured.

Dynamic adhering test was conducted as follows by using a Scott's tester.

To a rotatable cylinder, a sample in a shape of a long strip of paper consisting of a cord, rubber and cotton cloth was hung with the cord placed outwardly, the both ends of the sample were inserted by fasteners and by rising and following the sample, elongation and bending were imparted to the sample under the following conditions.

Load 8 kg./1,100 De × 2-ply cord, number of twist:
51×51 T/10 cm.
Bending cycle 200 r.p.m.
Bending cylinder diameter 30 mm.
Temperature 20° C.

The time when peeling occurred between the cord and the rubber (minutes) was measured and made a dynamic adhering life.

The unvulcanized rubber blend used in examples 1–20 and controls 1–4 had the following composition A, and composition of the rubber B used in examples 1 and 19 was shown below.

| A | | B | |
|---|---|---|---|
| Natural rubber | 100 | SBR | 100 |
| ZnO | 20 | ZnO | 20 |
| Stearic acid | 3 | Stearic acid | 1.5 |
| Seast 0305 HAF | 50 | Channel black | 40 |
| Aging resister PA | 1 | | |
| Pine tar | 1.5 | | |
| Sulfur | 3 | Sulfur | 2 |
| Coumarone HM | 2.5 | | |
| Vulcanization accelerator M* | 1 | Vulcanization accelerator DM** | 1.75 |
| | 182 PHR | | 150.25 PHR |

*M: Mercaptobenzothiazole

**DM: Benzothiazldisulfide

EXAMPLE 1

One hundred parts of polyethylene terephthalate copolymerizing 0.8 mol percent of pentaerythritol and having a reduced viscosity of 0.178 were dissolved in 700 parts of dimethyl sulfoxide at 160° C. in a nitrogen atmosphere. To said solution, 17.6 parts of ethylene glycol and 82.4 parts of diphenylmethane diisocyanate were added sequentially with stirring and the mixture was reacted at said temperature for 30 minutes. The reaction mixture was poured into a mixture of 1,700 parts of water and 600 parts of ice.

The precipitated polymer was filtered, washed with water and dried under a reduced pressure. This polymer was so dissolved in dimethyl formamide at 125°–135° C. so that the polymer might become 1 percent by weight therein and at said temperature, a high tenacity polyethylene terephthalate yarn (1,100 De × 2-ply cord, number of twist: 51×51 T/10 cm.) was immersed in said solution for 1 minute, dried at 80° C. for 3 minutes and heat treated at 180° C. for 5 minutes, respectively at a constant length. The resin pickup at this immersion treatment was 1.1 percent by weight. This yarn was treated with a resorcinol formalin latex normally used for adhering of a rayon fiber and a polyamide fiber to rubber and heat treated at 210° C. for 3 minutes. This resorcinol formalin latex treating solution was prepared under the following conditions.

```
Solution A:
   Resorcinol                    1.85 parts
   37 percent Formalin           2.75 parts
   Water                        18.00 parts
   10 percent NaOH               0.50 part
Solution B:
   Butadienevinyl-
   pyridine-latex (40 percent)  36.5 parts
   Natural rubber
   latex (60 percent)            6.0 parts
   Water                        34.5 parts
```

The mixed solution was adjusted to pH 8.5 by 10 percent NaOH.

Solution A was condensed at 20° C. for 6 hours, thereafter it was mixed with solution B and the mixture matured for at least 24 hours was used.

The adhering strength of the obtained cord to rubber A according to H-test was average 15.2 kg. The dynamic adhering life was 920 minutes. The adhering strength of the obtained cord to rubber B was average 14.9 kg.

EXAMPLE 2

24.00 Parts of polyethylene terephthalate copolymerizing 0.8 mol percent of pentaerythritol and having a reduced viscosity of 0.16 were dissolved in 300 parts of dimethyl sulfoxide at 150° C. in a nitrogen atmosphere. To said mixed solution, 19.78 parts of diphenylmethane diisocyanate were added with stirring, further, 0.0198 part of triethylenediamine dissolved in 4.22 parts of ethylene glycol was added. At said temperature stirring was continued for 2 hours and the entire mixture was poured into 4,000 parts of water.

The precipitated polymer was filtered, washed with water, thereafter dried in a reduced pressure drier. Said polymer was dissolved in dimethylformamide at 135°–140° C. such that the polymer might become 1 percent by weight therein and at said temperature a high tenacity polyethylene terephthalate yarn (1,100 De × 2-ply cord, number of twist: 50×50 T/10 cm.) was immersed in the solution for 3 minutes, dried at 80° C. under atmospheric pressure for 30 minutes and heat treated at 180° C. for 5 minutes in this sequence, respectively at a constant length. Said yarn was treated with the same resorcinol formalin latex adhering solution as used in example 1, thereafter heat treated at 200° C. for 15 minutes. The adhering strength of the obtained cord to rubber A according to H-test was average 14.8 kg.

EXAMPLE 3

The polymer obtained as in example 1 was so dissolved at 100° C. in metacresol that it might become 5 percent by weight therein, which solution was so added dropwise to water dissolving 0.63 percent by weight of an emulsifier of the sodium alkylbenzenesulfonate series that the polymer might become 0.5 percent of the total weight with high-speed stirring. Further, the mixture was stirred at a high speed for 1 hour to be emulsified. Until completion of the stirring, the liquid temperature rose gradually, reaching about 40° C. In this emulsion at room temperature the same cord as used in example 1 was immersed for 15 seconds, dried at 100° C. for 5 minutes and heat treated at 180° C. for 3 minutes by this sequence, respectively at a constant length. Said cord was treated with the same resorcinol formalin latex adhering solution as used in example 1 and heat treated at 200° C. for 1.5 minutes. The adhering strength of this cord to rubber A according to H-test was average 15.0 kg.

CONTROL 1

20.0 Parts of polyethylene sebacate having a reduced viscosity of 0.210 were dissolved in a nitrogen atmosphere at 150° C. in 300 parts of dimethyl sulfoxide, to said solution 16.1 parts of diphenylmethane diisocyanate were added with stirring, further, 3.7 parts of ethylene glycol dissolving therein 0.016 part of triethyldiamine were added. At said temperature, stirring was continued for 1 hour, and the mixture was poured into 3,000 parts of water. The precipitated polymer was filtered, washed with water and dried in a reduced pressure drier. This polymer was so dissolved at 135°–140° C. in dimethylformamide that it might become 1 percent by weight therein, and at said temperature a high tenacity polyethylene terephthalate yarn (1,100 De × 2-ply cord, number of twist: 50×50 T/10 cm. was immersed in said solution for 3 minutes, dried at 80° C. for 30 minutes under atmospheric pressure, thereafter heat treated at 80° C. for 5 minutes, respectively at a constant length. The resin pickup due to this immersion treatment was 1.2 percent by weight. The so treated yarn was treated with the same resorcinol formalin latex adhering solution as used in example 1, and heat treated at 200° C. for 1.5 minutes. The adhering strength of the obtained cord to rubber A according to H-test was average 9.8 kg. only.

EXAMPLE 4

6.09 Parts of polyethylene terephthalate having a reduced viscosity of 0.138 were dissolved in 80 parts of dimethyl sulfoxide in a nitrogen gas stream at 150° C., to said solution 3.84 parts of toluylene diisocyanate (molar ratio of 2.4 to 2.6 = about 4:1) and 0.0026 part of triethylenediamine were added with stirring and a reaction was carried out at said temperature for 30 minutes, thereafter 2.25 parts of hexamethylene diamine were added to the reaction mixture and a reaction was further carried out for 3 hours. The reaction liquid was poured into 1,500 parts of water, the precipitated polymer was filtered, washed with water and dried in a reduced pressure drier.

This polymer was so dissolved at 100°–120° C. in dimethyl formamide so that the polymer might become 1.5 percent by weight therein, and at said temperature using the same cord as used in example 1 the similar treatment as in example 1 was carried out.

The so treated cord was treated with the same resorcinol formalin latex adhering solution as used in example 1, thereafter heat treated at 210° C. for 15 minutes. The adhering strength of the obtained cord to rubber A according to H-test was average 14.3 kg.

EXAMPLE 5

38.40 Parts of polyethylene terephthalate copolymerizing 0.8 mol percent of pentaerythritol and having a reduced viscosity of 0.167 were dissolved in 350 parts of dimethyl sulfoxide in a nitrogen atmosphere at 155° C., to which solution 30.04 parts of toluylene diisocyanate (molar ratio of 2.4 to 2.6 = about 4:1) were added with stirring, to which mixture a solution obtained by dissolving 0.0300 part of triethylene diamine in 8.36 parts of monoethanol amine was added dropwise. Stirring was continued at said temperature for 2 hours and the mixture was poured into 5,000 parts of water.

The precipitated polymer was filtered, washed with water and dried in a reduced pressure drier. This polymer was so dissolved at 110°–115° C. in dimethyl formamide that the polymer might become 1 percent by weight therein, and at said temperature the same polyethylene terephthalate as used in example 1 was immersed in said solution for 3 minutes, thereafter, dried at 80° C. for 30 minutes and then heat treated at 180° C. for 5 minutes, respectively at a constant length.

The so treated cord was similarly treated with the same resorcinol formalin latex adhering solution as used in example 1 and heat treated at 210° C. for 1.5 minutes. The adhering strength of the obtained cord to rubber A according to H-test was 15.2 kg.

EXAMPLE 6

4.80 Parts of polyethylene terephthalate copolymerizing 0.6 mol percent of pentaerythritol and having a reduced viscosity of 0.194 were dissolved in 70 parts of dimethyl sulfoxide in a nitrogen atmosphere at 150° C., to which solution a mixture of 0.422 part of ethylene glycol, 0.418 part of ethanolamine and 0.004 part of triethylenediamine as well as 3.96 parts of diphenylmethane diisocyanate were added with stirring and a reaction was further carried out for 2 hours. The reaction liquid was poured into 1,000 parts of water, the precipitated polymer was filtered, washed with water and dried under a reduced pressure.

This polymer was so dissolved at 105°–110° C. in dimethyl formamide so that the polymer might become 1 percent by weight therein, and the same polyethylene terephthalate cord as used in example 1 was immersed in the solution at room temperature for 3 minutes, dried at 80° C. for 30 minutes and then heat treated at 180° C. for 5 minutes, respectively at a constant length, treated similarly with the same resorcinol formalin latex as used in example 1, and then heat treated at 210° C. for 15 minutes. The adhering strength of the obtained cord to rubber A according to H-test was 15.2 kg.

EXAMPLE 7

15.0 Parts of polyethylene terephthalate copolymerizing 0.80 mol percent of pentaerythritol and having a reduced viscosity of 0.186 were dissolved in 700 parts of dimethyl sulfoxide in a nitrogen atmosphere at 150° C., to which solution 48.3 parts of diphenylmethane diisocyanate, 11.8 parts of ethylene glycol and 0.048 part of triethylene diamine were added to carry out a polymerization for 2 hours, and the reaction mixture was poured into 5,000 parts of water. The precipitated polymer was filtered, washed with water and dried in a reduced pressure drier. The polymer was so dissolved at 135°–140° C. in dimethyl formamide that the polymer might become 1 percent by weight therein, and at said temperature a high tenacity polyethylene terephthalate yarn (1,100 De × 2-ply cord, number of twist: 51×51 T/10 cm.) was immersed in the solution for 3 minutes, dried at 80° C. for 3 minutes under atmospheric pressure, and then heat treated at 180° C. for 5 minutes, respectively at a constant length. The resin pickup in this immersion treatment was 1.0 percent by weight. This treated yarn was treated with the same resorcinol formalin latex adhering solution as used in example 1, and heat treated at 210° C. for 1.5 minutes. The adhering strength of the obtained cord to rubber A according to H-test was averate 13.5 kg.

EXAMPLE 8

60.0 Parts of polyethylene terephthalate copolymerizing 0.8 mol percent of pentaerythritol and having a reduced viscosity of 0.197 were dissolved in 700 parts of dimethyl sulfoxide in a nitrogen atmosphere at 150° C., to which solution 13.05 parts of diphenylmethane diisocyanate, 1.85 parts of ethylene glycol and 0.013 part of triethylene diamine were added with stirring to carry out a polymerization for 1 hour. The reaction mixture was poured in 4,000 parts of water. The precipitated polymer was filtered, washed with water and dried in a reduced pressure drier. The dried polymer was so dissolved at 135°–140° C. in dimethyl formamide that the polymer might become 1 percent by weight therein, and at said temperature a high tenacity polyethylene terephthalate (1,100 De × 2-ply cord, number of twist: 51×51 T/10 cm.) was immersed in the solution, dried at 80° C. for 3 minutes under atmospheric pressure and then heat treated at 180° C. for 3 minutes, respectively at a constant length. The resin pickup at this immersion treatment was 1.4 percent by weight.

This yarn was treated with the same resorcinol formalin latex adhering solution as used in example 1 and heat treated at 210° C. for 1.5 minutes. The adhering strength of the obtained cord to rubber A according to H-test was average 13.5 kg.

EXAMPLE 9

8.10 Parts of polyethylene terephthalate copolymerizing 20 mol percent of sebacic acid and having a reduced viscosity of 0.205 were dissolved in 150 parts of dimethyl sulfoxide in a nitrogen gas stream at 150° C., to which solution 3.51 parts of toluylene diisocyanate were added and the mixture was reacted for 1 hour, thereafter 4.60 parts of dihydrazide sebacate were added and a polymerization was carried out for 1 more hour, and the reaction mixture was poured into 1,000 parts of water. The precipitated copolymer was filtered, washed with water and dried in a reduced pressure drier. This polymer was so dissolved at 138°–140° C. in dimethyl formamide that the polymer might become 1 percent by weight therein, and at said temperature the same cord as used in example 1 was similarly treated as in example 1, thereafter the cord was treated with the same resorcinol formalin latex adhering solution as used in example 1, thereafter heat treated at 210° C. for 3 minutes.

The adhering strength of the obtained cord to rubber A according to H-test was average 14.0 kg.

EXAMPLE 10

Twenty parts of polyethylene-2,6-naphthalate having a reduced viscosity of 0.163 were dissolved in 300 parts of dimethyl sulfoxide in a nitrogen atmosphere at 150° C., to which solution 3.7 parts of ethylene glycol, 16.1 parts of diphenylmethane diisocyanate and 0.016 part of triethyldiamine were added with stirring, at said temperature stirring was continued for 2 hours and the mixture was poured into 3,000 parts of water. The precipitated polymer was filtered, washed with water and dried in a drier. This polymer was so dissolved at 140° C. in dimethyl formamide so that the polymer might become 1 percent by weight therein, and at said temperature said solution was applied to a high tenacity polyethylene-2,6-naphthalate yarn (1,000 De 2-ply cord, number of twist: 53×53 T/10 cm.). The resin pickup at this immersion treatment was 1.5 percent by weight. This yarn was treated with the same resorcinol formalin latex adhering solution as used in example 1, further, heat treated at 210° C. for 3 minutes. The adhering strength of this yarn to rubber A according to H-test was average 13.7 kg.

CONTROL 2

10.0 Parts of polyethylene terephthalate copolymerizing with 0.4 mol percent of pentaerythritol and having a reduced viscosity of 0.190 were dissolved in 150 parts of dimethyl sulfoxide in a nitrogen atmosphere at 150° C., to which solution 81.0 parts of diphenyl methane diisocyanate were added with stirring, further 0.081 part of triethylene diamine dissolved in 19.0 parts of ethylene glycol was added, stirring was continued for 1 hour and the mixture was poured into 3,000 parts of 3,000

The precipitated polymer was filtered, washed with water and dried in a reduced pressure drier. This polymer was so dissolved at 120° C. in dimethyl formamide that the polymer might become 1 percent by weight therein, and at said temperature a high tenacity polyethylene terephthalate yarn (1,100 De × 2-ply cord, number of twist: 51×51 T/10 cm.) was immersed in said solution for 3 minutes, dried at 80° C. for 3 minutes under atmospheric pressure, and then heat treated at 180° C. for 5 minutes, respectively at a constant length. The resin pickup in this immersion treatment was 1.6 percent by weight. The yarn was treated with the same resorcinol formalin latex adhering solution as used in example 1, further, heat treated at 210° C. for 3 minutes. The adhering strength of the obtained cord to rubber A according to H-test was average 9.0 kg.

CONTROL 3

Ninety parts of polyethylene terephthalate copolymerizing 0.8 mol percent of pentaerythritol and having a reduced viscosity of 0.195 were dissolved in 800 parts of dimethyl sulfoxide in a nitrogen atmosphere at 150° C., to which solution 9.76 parts of diphenyl methane diisocyanate; 0.24 part of ethylene glycol and 0.0098 part of triethylene diamine were added with stirring to carry out a polymerization for 60 minutes. The reaction mixture was poured into 7,000 parts of water.

The precipitated polymer was filtered, washed with water and dried in a reduced pressure drier. This polymer was so dissolved at 135°–140° C. in dimethyl formamide that the polymer bight become 1 percent by weight therein, and at said temperature a high tenacity polyethylene terephthalate yarn (1,100 De × 2-ply cord, number of twist: 51×51 T/10 cm.) was immersed in said solution, dried at 80° C. for 3 minutes under atmospheric pressure and then heat treated at 180° C. for 5 minutes, respectively at a constant length. The resin pickup in this immersion treatment was 1.3 percent by weight. The yarn was treated with the same resorcinol formalin latex adhering solution as used in example 1, and heat treated at 220° C. for 1.5 minutes. The adhering strength of the obtained cord to rubber A according to H-test was average 9.5 kg.

EXAMPLE 11

20.00 Parts of polyethylene terephthalate copolymerizing 0.8 mol percent of pentaerythritol and having a reduced viscosity of 0.172 were dissolved in 250 parts of dimethyl sulfoxide in a nitrogen atmosphere at 140° C., to which solution 13.72 parts of toluylene diisocyanate (molar ratio of 2.4 to 2.6=4:1a) were added and further 0.0137 part of triethylene diamine dissolved in 6.35 parts of butene diol was added with stirring. At said temperature, stirring was continued for 1 hour and the mixture was poured into 2,000 parts of water. The precipitated polymer was filtered, washed with water and then dried in a reduced pressure drier. The polymer was so dissolved at 135°–140° C. in dimethyl formamide that the polymer might become 1.0 percent by weight therein, and at said temperature a high tenacity polyethylene terephthalate yarn (1,100 De × 2-ply cord, number of twist: 50×50 T/10 cm.) was immersed in said solution for 3 minutes, dried at 80° C. for 3 minutes under atmospheric pressure, and then heat treated at 180° C. for 5 minutes, respectively at a constant length. The yarn was treated with the same resorcinol formalin latex as used in example 1, and heat treated at 210° C. for 1.5 minutes. The adhering strength of the obtained cord to rubber A according to H-test was average 15.8 kg.

EXAMPLE 12

The polymer obtained according to the process of example 11 was so dissolved at 100° C. in metacresol that the polymer might become 5 percent by weight therein, which solution was added dropwise to water dissolving 0.63 percent by weight of an emulsifier of the alkylbenzene sulfonic acid series at a high speed with stirring to make the amount of the polymer 0.5 percent by weight of the entire amount. Stirring at a high speed was continued for another 1 hour to emulsify the solution. Until completion of stirring, the liquid temperature rose gradually, reaching about 40° C. In this emulsion, the same cord as used in example 1 was immersed at room temperature for 15 seconds, dried at 100° C. for 5 minutes and then heat treated at 180° C. for 3 minutes, respectively at a constant length. The cord was treated with the same resorcinol formalin latex adhering solution as used in example 1 and heat treated at 210° C. for 1.5 minutes. The adhering strength of this cord to rubber A according to H-test was average 16.1 kg.

EXAMPLE 13

10.00 Parts of polyethylene terephthalate copolymerizing 10 mol percent of isophthalic acid and having a reduced viscosity of 0.203 was dissolved in 120 parts of dimethyl sulfoxide in a nitrogen atmosphere at 135° C., to which solution 2.45 parts of diphenylmethane diisocyanate and 0.0036 part of triethylene diamine were added, and 5.00 parts of polyethylene maleate having a low degree of polymerization (DP: about 5) were further added with stirring, at said temperature stirring was continued for 1.5 hours and the mixture was poured into 1,200 parts of water. The precipitated polymer was filtered, washed with water and dried in a reduced pressure drier. This polymer was so dissolved at 120° C. in dimethyl formamide that the polymer might become 1.0 percent by weight therein, and at said temperature the same polyethylene terephthalate cord as in example 1 was immersed in said solution for 3 minutes, dried at 80° C. for 30 minutes under a reduced pressure, and then heat treated at 180° C. for 5 minutes, respectively at a constant length. This cord was treated with the same resorcinol formalin latex adhering solution as used in example 1, thereafter heat treated at 210° C. for 1.5 minutes. The adhering strength of the obtained cord to rubber A according to H-test was average 14.8 kg.

EXAMPLE 14

150.0 Parts of polyethylene terephthalate copolymerizing 0.8 mol percent of pentaerythritol and having a reduced viscosity of 0.187 were dissolved in 700 parts of dimethyl sulfoxide in a nitrogen atmosphere at 150° C., to which solution 16.01 parts of ethylene glycol, 30.64 parts of sodium 3,5-di(carbohydroxyethoxy) benzene sulfonate and 0.103 part of triethylene diamine were added with stirring, further 103.4 parts of diphenylmethane diisocyanate were added. The mixture was polymerized as it was for 60 minutes and the polymerization mixture was poured into 9,000 parts of ice water. Using a homogenizer the mixture was pulverized into finely divided particles at room temperature and a stable water emulsion was obtained. This water emulsion was applied to a high tenacity polyethylene terephthalate yarn (1,100 De × 2-ply cord, number of twist: 51×51 T/10 cm.) and the so applied yarn was heat treated at 220° C. for 3 minutes. The yarn was treated with the same resorcinol formalin latex adhering solution as used in example 1, and heat treated at 210° C. for 3 minutes. The adhering strength of this yarn to rubber A according to H-test was average 14.6 kg.

EXAMPLE 15

64.0 Parts of polyethylene terephthalate having a reduced viscosity of 0.133 were dissolved in 450 parts of dimethyl sulfoxide in a nitrogen atmosphere at 150° C., to which solution 7.2 parts of ethylene glycol were added with stirring. On the other hand, 45.8 parts of diphenylmethane diisocyanate were dissolved in 180 parts of dimethyl sulfoxide, to which solution 11.0 parts of sodium 4,4'-diaminodiphenyl-3-sulfonate were added, said solution was added to the foregoing dimethyl sulfoxide solution of polyethylene terephthalate and ethylene glycol, and the mixed solution was polymerized as it was for 20 minutes, thereafter the polymerization mixture was poured into 2,000 parts of ice water. The resultant mixture was stirred by using a homomixer to obtain a stable water emulsion. This water emulsion was applied to a high tenacity polyethylene terephthalate yarn (1,100 De × 2-ply cord, number of twist: 51×51 T/10 cm.) and the applied yarn was heat treated at 240° C. for 3 minutes. This yarn was treated with the same resorcinol formalin latex as used in example 1, thereafter heat treated at 210° C. for 3 minutes. The adhering strength of this yarn to rubber A according to H-test was average 14.7 kg.

EXAMPLE 16

3.48 Parts of polyethylene terephthalate having a reduced viscosity of 0.120 were dissolved in 70 parts of dimethyl sulfoxide in a nitrogen atmosphere at 150° C., to which solution 1.74 parts of toluylene diisocyanate (molar ratio of 2.4 to 2.6 = about 4:1) and 0.0012 parts of triethylene diamine were added with stirring, the mixture was reacted at said temperature for 10 minutes, thereafter 1.16 parts of toluylene diisocyanate and 1.51 parts of potassium 4,4'-diaminodiphenyl-2-sulfonate were added thereto, further 1.16 parts of hexamethylene diamine were added thereto. The mixture was polymerized for further 60 minutes, and the reaction liquid was poured into 600 parts of ice water, which mixture was pulverized into finely divided particles at room temperature by using a homogenizer to obtain a stable water emulsion. This water emulsion was applied to a high tenacity polyethylene terephthalate yarn (1,100 De × 2-ply cord, number of twist: 51×51 T/10 cm.), and the so applied yarn was heat treated at 240° C. for 3 minutes. This yarn was treated with the same resorcinol formalin latex adhering solution as used in example 1, further heat treated at 120° C. for 3 minutes. The adhering strength of this yarn to rubber A according to H-test was average 14.0 kg.

EXAMPLE 17

24.0 Parts of copolymeric polyethylene terephthalate copolymerizing 0.8 mol percent of pentaerythritol and 15 mol percent of sodium 3,5-carbomethoxybenzene sulfonate and having a reduced viscosity of 0.20 were dissolved in 300 parts of dimethylsulfoxide in a nitrogen atmosphere at 150° C., to which solution 19.8 parts of diphenylmethane diisocyanate, 4.2 parts of ethylene glycol and 0.0198 part of triethylene diamine were added with stirring to polymerize the mixture for 60 minutes and the reaction mixture was poured into 2,000 parts of ice water, which mixture was pulverized into finely divided particles at room temperature by using a homogenizer to give a stable water emulsion. This water emulsion was applied to a high tenacity polyethylene terephthalate yarn (1,100 De × 2-ply cord, number of twist: 51×51 T/10 cm.), and the so applied yarn was heat treated at 210° C. for 3 minutes. The resin pickup at this time was 0.99 percent by weight. Said yarn was treated with the same resorcinol formalin latex adhering solution as used in example 1, and heat treated at 210° C. for 3 minutes. The adhering strength of this yarn to rubber A according to H-test was 13.5 kg.

EXAMPLE 18

15.0 Parts of polyethylene terephthalate copolymerizing 0.8 mol percent of pentaerythritol and having a reduced viscosity of 0.182 were dissolved in 300 parts of dimethylsulfoxide in a nitrogen atmosphere at 150° C., to which solution 2.7 parts of ethylene glycol, 0.78 part of N-n-butyldiethanolamine and 0.103 part of triethylene diamine were added with stirring, further 13.64 parts of diphenylmethane diisocyanate were added to polymerize the mixture as it was for 60 minutes. The reaction mixture was so dissolved in water that the polymer concentration might become 1 percent by weight and nonion Nissan Nonion Lt-221 might become 0.1 percent by weight therein, to which solution 0.29 part of acetic acid was added and by using a homogenizer the mixture was pulverized into finely divided particles at room temperature to give a stable water emulsion. This water emulsion was applied to a high tenacity polyethylene terephthalate yarn (1,100 De × 2-ply cord, number of twist: 51×51 T/10 cm.) and the so applied yarn was heat treated at 220° C. for 3 minutes. The resin pickup at this immersion treatment was 1.1 percent by weight. This yarn was treated with the same resorcinol formalin latex as used in example 1, and then heat treated at 210° C. for 3 minutes. The adhering strength of this yarn to rubber A according to H-test was average 13.6 kg. The dynamic adhering life of this yarn was average 845 minutes. The adhering strength of this yarn to rubber B was average 13.3 kg.

EXAMPLE 19

19.2 Parts of polyethylene terephthalate copolymerizing 10 mol percent of sodium 3,5-di(carbomethoxy)benzenesulfonate and 0.8 mol percent of pentaerythritol and having a reduced viscosity of 0.151 were dissolved in a nitrogen atmosphere at 140° C. in 220 parts of dimethylsulfoxide, to which solution 2.65 parts of ethylene glycol, 2,06 parts of sodium 3,5-di($\beta$-hydroxyethoxycarbo)benzenesulfonate, 0.003 part of triethylene diamine and 14.49 parts of diphenylmethane diisocyanate were added in this sequence to react the mixture for 30 minutes. An emulsion obtained by pouring the reaction mixture in 730 parts of water was opaque. In this emulsion a high tenacity polyethylene terephthalate yarn (1,100 De × 2-ply cord, number of twist: 51×51 T/10 cm.) was immersed for 3 minutes, the yarn was dried at 80° C. for 5 minutes under atmospheric pressure, thereafter heat treated at 240° C. for 2 minutes, respectively at a constant length. The resin pickup at this immersion treatment was 1.6 percent by weight. The yarn was treated with the same resorcinol formalin latex adhering solution as used in example 1, and heat treated at 210° C. for 3 minutes. The adhering strength of the obtained cord to rubber A according to H-test was average 14.4 kg.

CONTROL 4

In a mixed dispersed aqueous solution of 5 percent of Hylene MP, 0.5 percent of Aerosol OT, 0.2 percent of sodium alginate and 5 percent of vinyl pyridine latex (40 percent), a high tenacity polyethylene terephthalate yarn (1,100 De × 2-ply cord, number of twist: 51×51 T/10 cm.) was immersed at 25° C. for 30 seconds, thereafter, the yarn was heat treated at 220° C. for 3 minutes. This yarn was treated with the same resorcinol formalin latex adhering solution as used in example 1 and then heat treated at 210° C. for 3 minutes. The adhering strength of this yarn to rubber A according to H-test was average 14.5 kg. The dynamic adhering life of this yarn was average 450 minutes.

We claim:

1. A bonded article comprising a base layer prepared from a crystalline ethylene terephthalate polyester wherein at least 60 mol percent of the structural units consist of ethylene terephthalate units or a crystalline ethylene 2,6-naphthalate polyester wherein at least 60 mol percent of the structural units consist of ethylene 2,6-naphthalate units; a first coating on said base layer consisting essentially of a polyester-polyurethane polymer containing segments derived from a crystalline polyester, the crystalline polyester segments being derived from an ethylene terephthalate polyester when said base layer is a crystalline ethylene terephthalate polyester and an ethylene 2,6-naphthalate polyester when said base layer is a crystalline ethylene 2,6-naphthalate polyester, the weight ratio of the polyester segments in said polyester-polyurethane to the polyurethane segments being from 1:6 to 6:1; a second coating on said first coating consisting essentially of a resorcinol-formaldehyde condensate; and a rubber layer bonded to said base layer through said first and second coating, said first and second coatings being of thicknesses sufficient to cause improved adhesion between said rubber layer and polyester base layer.

2. The bonded article of claim 1 wherein the crystalline polyester is an ethylene terephthalate polyester.

3. The bonded article of claim 1 wherein the polyester-polyurethane contains alkali metal sulfonate groups.

4. The bonded article of claim 3 wherein the polyester-polyurethane contains said alkali metal sulfonate groups in an amount, calculated as sulfur, of 0.05 to 4.0 percent by weight.

5. The bonded article of claim 1 wherein the polyester-polyurethane contains ethylene terephthalate polyester segments modified by up to 1.5 mol percent, based on the terephthalic acid component, of a chain branching agent having three or four ester-forming groups.

6. The bonded article of claim 5 wherein the modified polyester segments are derived from a modified polyethylene terephthalate having a reduced viscosity of 0.10 to 0.30 measured at 35° C. in o-chlorophenol.

7. The bonded article of claim 5 wherein the weight ratio of the modified polymer to the remainder of the polyester-polyurethane is from 1:4 to 4:1.

* * * * *